(12) United States Patent
Chen

(10) Patent No.: US 7,383,925 B2
(45) Date of Patent: Jun. 10, 2008

(54) BRAKE ASSEMBLY FOR A STROLLER

(75) Inventor: Shun-Min Chen, Taipei (TW)

(73) Assignee: Wonderland Nursery Goods Co., Ltd., Taipei (TW)

( * ) Notice: Subject to any disclaimer, the term of this patent is extended or adjusted under 35 U.S.C. 154(b) by 161 days.

(21) Appl. No.: 11/177,052

(22) Filed: Jul. 8, 2005

(65) Prior Publication Data
US 2006/0196736 A1    Sep. 7, 2006

(30) Foreign Application Priority Data
Mar. 1, 2005    (CN) .................. 2005 2 0004139

(51) Int. Cl.
*B62B 9/08* (2006.01)
*F16D 65/14* (2006.01)
(52) U.S. Cl. .................... 188/20; 188/19; 188/2 D
(58) Field of Classification Search .............. 188/19, 188/20, 21, 22, 31, 2 D
See application file for complete search history.

(56) References Cited

U.S. PATENT DOCUMENTS

| | | | | |
|---|---|---|---|---|
| 2,988,175 A | * | 6/1961 | West | 188/31 |
| 4,567,964 A | * | 2/1986 | Kassai | 188/20 |
| 4,997,066 A | * | 3/1991 | Bigo | 188/31 |
| 5,373,917 A | * | 12/1994 | Kamman | 188/19 |
| 5,460,399 A | * | 10/1995 | Baechler et al. | 188/20 |
| 6,170,615 B1 | * | 1/2001 | Cheng | 188/20 |
| 6,341,672 B1 | | 1/2002 | Yang et al. | 188/20 |
| 6,408,990 B1 | * | 6/2002 | Chen | 188/20 |

FOREIGN PATENT DOCUMENTS

| | | | |
|---|---|---|---|
| EP | 64368 A2 | * | 11/1982 |
| GB | 2277565 A | * | 11/1994 |
| GB | 2 351 131 B | | 6/2000 |
| JP | 10-157631 | | 6/1998 |

OTHER PUBLICATIONS

U.S. Appl. No. 10/982,720, filed Nov. 5, 2004, Chen.

* cited by examiner

*Primary Examiner*—Thomas J Williams
(74) *Attorney, Agent, or Firm*—Frommer Lawrence & Haug LLP; Ronald R. Santucci

(57) ABSTRACT

A brake assembly for a stroller includes left and right braking mechanisms, a connecting member, and left and right operating members interconnected to each other through the connecting member so as to move in opposite directions when operated. Each of the left and right braking mechanisms includes a first engaging member, and a second engaging member movable between engaging and disengaging positions and defining a first cam face. Each of the left and right operating members defines a second cam face which is in sliding contact with a respective first cam face so as to drive the second engaging member to move to the engaging position in an axial direction when the left operating member is operated, and so as to drive the second engaging member to move to the disengaging position when the right operating member is operated.

14 Claims, 15 Drawing Sheets

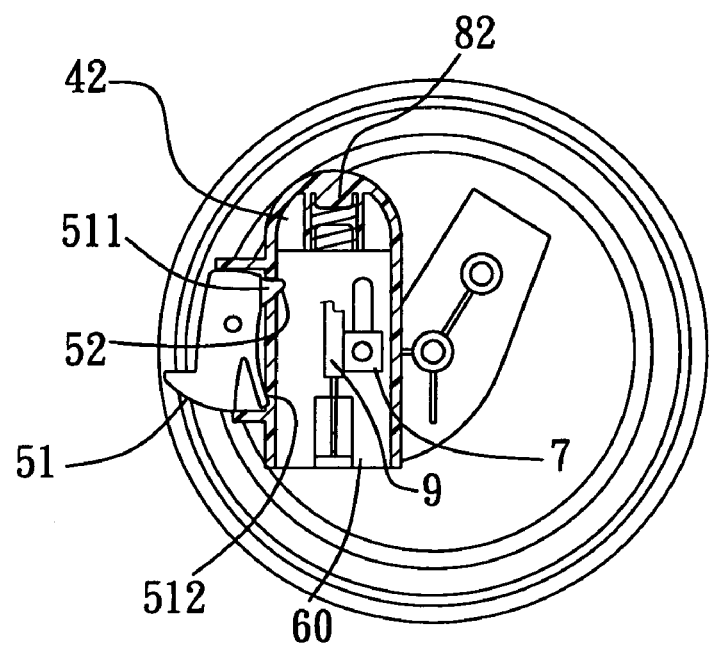
F I G. 8
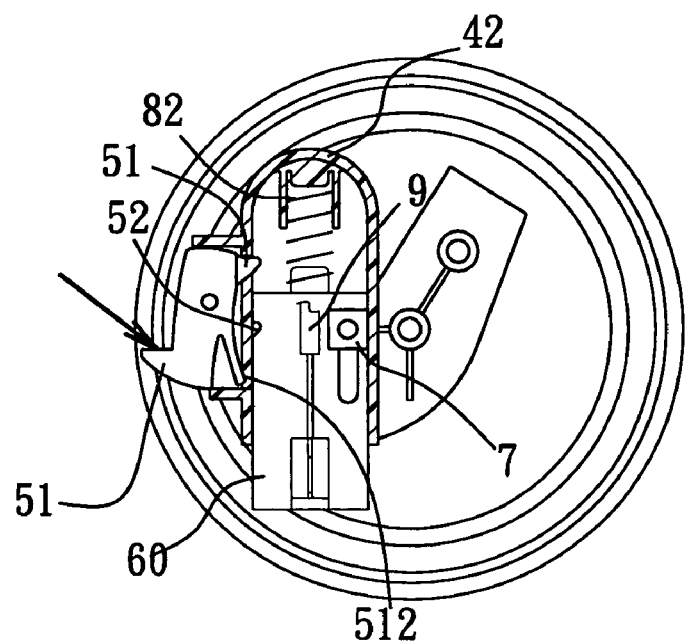
F I G. 9

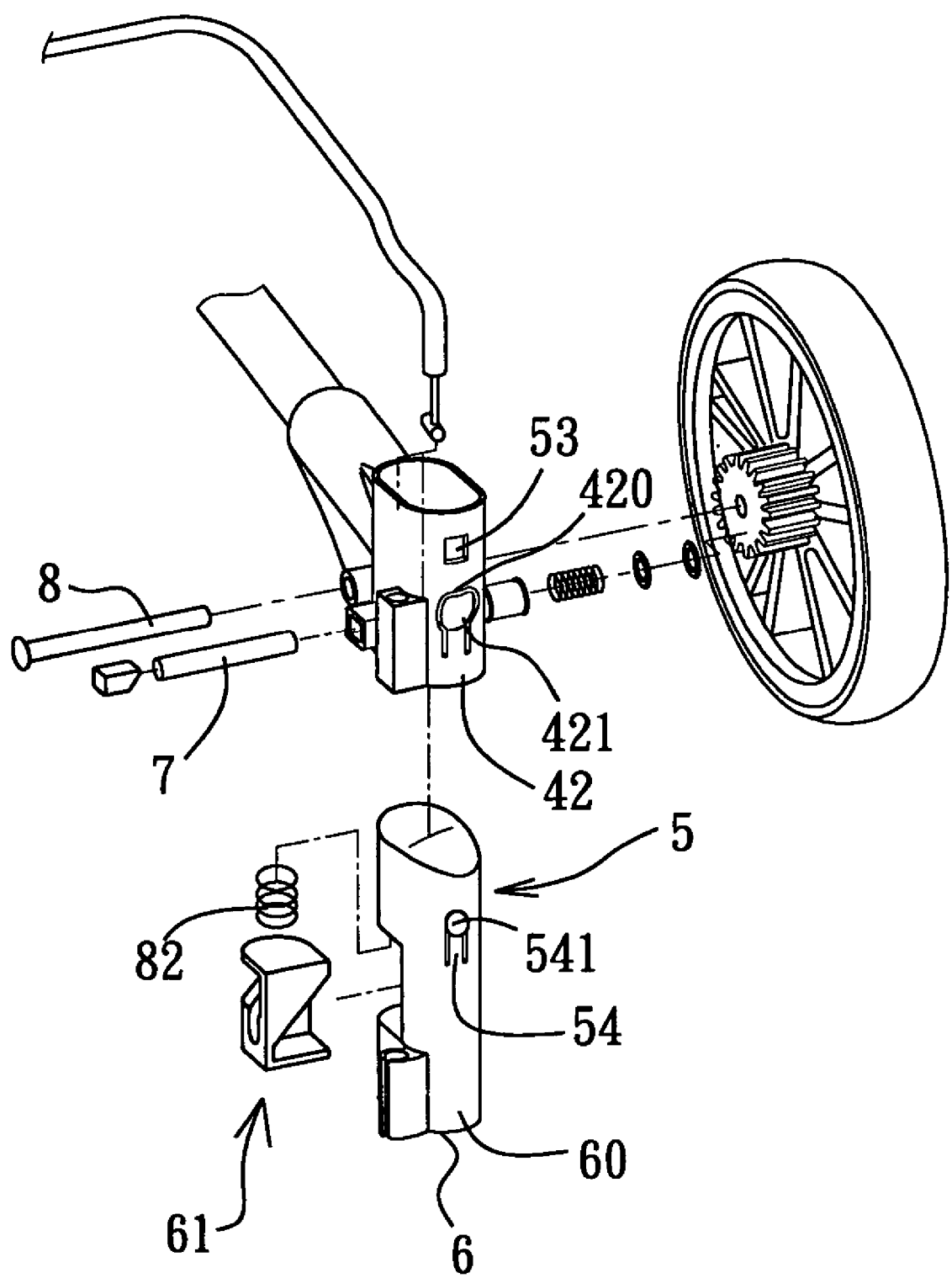
F I G. 14

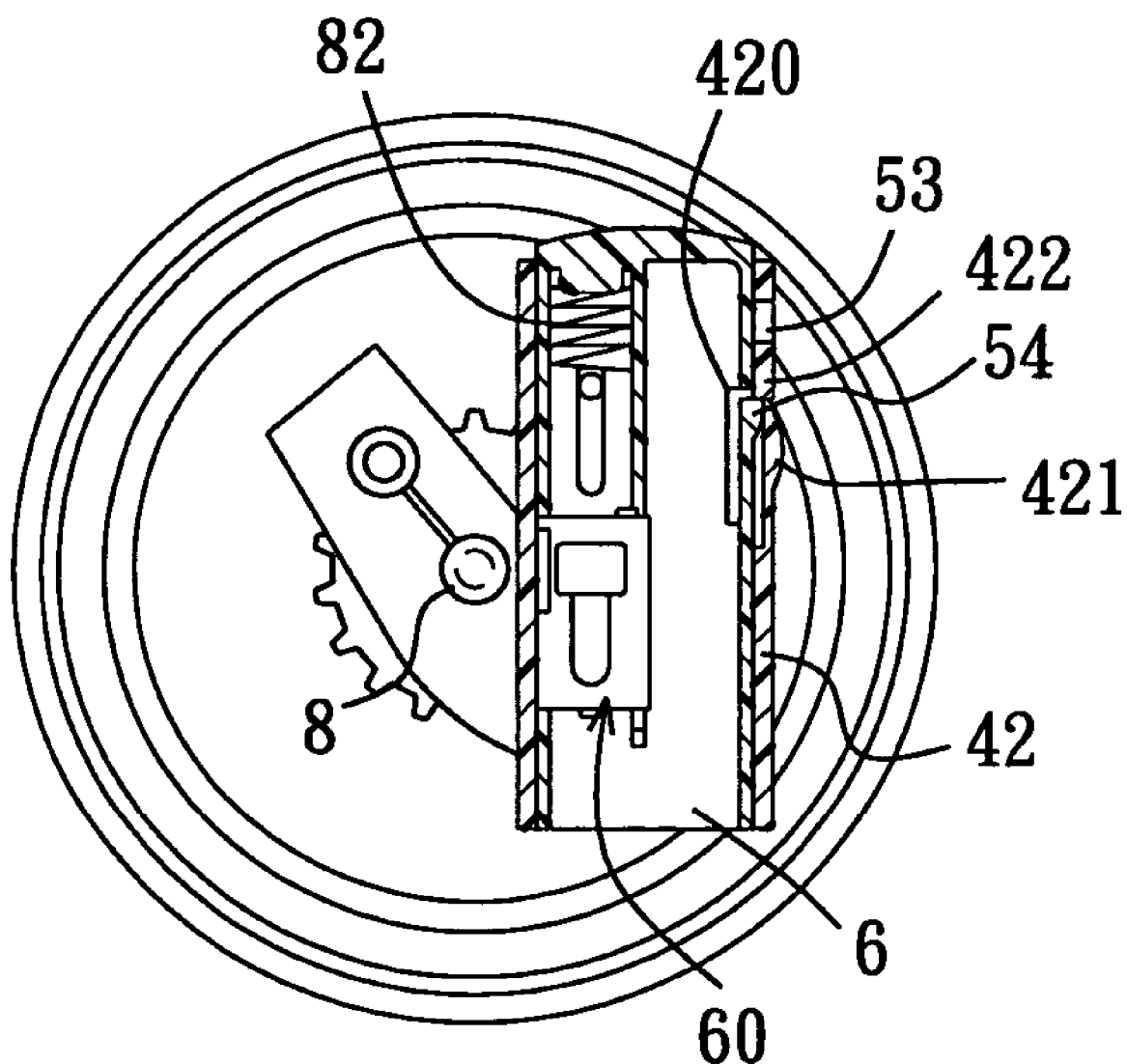
F I G. 15

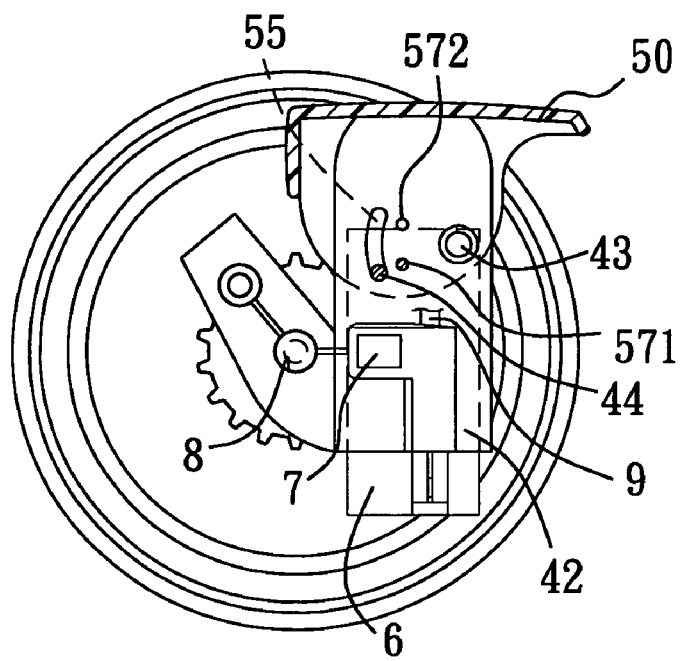
F I G. 17
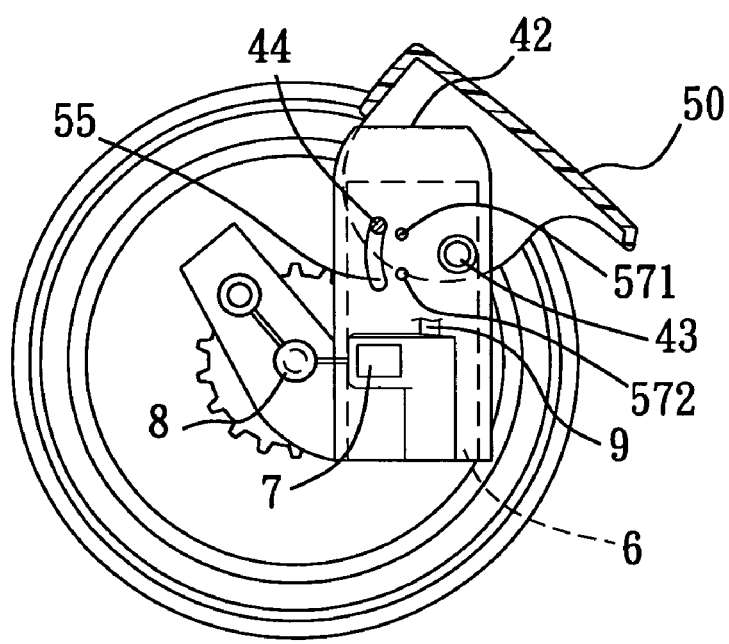
F I G. 18

BRAKE ASSEMBLY FOR A STROLLER

CROSS-REFERENCE TO RELATED APPLICATION

This application claims priority of Chinese Patent Application No. 200520004139X, filed on Mar. 1, 2005.

BACKGROUND OF THE INVENTION

1. Field of the Invention

This invention relates to a brake assembly for a stroller, more particularly to a brake assembly including left and right brake operating members, one of which is operable to actuate left and right braking mechanisms to engage respectively left and right wheels of the stroller, and the other of which is operable to actuate the left and right braking mechanisms to disengage the left and right wheels of the stroller.

2. Description of the Related Art

U.K. Patent Application GB2351131B discloses a conventional brake assembly for a stroller. The brake assembly includes two braking mechanisms for braking respectively left and right wheels of the stroller, and two operating elements connected respectively to the braking mechanisms and connected to each other through a cable in such a manner that the braking mechanisms are actuated to engage simultaneously and respectively the left and right wheels when one of the operating elements is pressed downwardly by foot, and that the braking mechanisms are actuated to disengage simultaneously and respectively the left and right wheels when the other of the operating elements is pressed downwardly by foot. Each braking mechanism includes a crown gear that is mounted on a respective one of the left and right wheels and that defines a plurality of angularly disposed engaging grooves, and an engaging pin that is fixed to a respective one of the operating elements and that is required to be moved together with the respective operating element toward the crown gear in a radial direction relative to an axle, which is connected to the left and right wheels, so as to be able to engage a selected one of the engaging grooves.

The aforesaid conventional brake assembly is disadvantageous in that since the engaging pin moves together with the respective operating element in the radial direction relative to the axle, each of the operating elements is required to be formed with an elongated radial slot for passage of the axle therethrough and for permitting radial movement relative to the axle. As a consequence, undesired interference between the axle and the operating elements during operation of the operating elements is likely to occur.

In a pending U.S. patent application Ser. No. 10/982,720 filed by the applicant on Nov. 5, 2004, there is disclosed a stroller brake assembly that includes two braking mechanisms operable through two operating members for braking wheels of the stroller. Each of the braking mechanisms includes a pin that is movable in a radial direction to engage a gear formed on the respective wheel and that is driven by a cam member which is in the form of an oblique slot formed in a sliding piece of the respective operating member.

SUMMARY OF THE INVENTION

The object of the present invention is to provide a stroller brake assembly that has operating members for actuating or releasing brake mechanisms of the stroller brake assembly and that is capable of overcoming the aforesaid drawback associated with the prior art.

According to this invention, there is provided a brake assembly for a stroller. The stroller includes a stroller frame and left and right wheels, each of which is connected to the stroller frame through an axle. The brake assembly comprises: left and right braking mechanisms associated respectively with the left and right wheels for braking the left and right wheels; a connecting member; and left and right operating members to be disposed respectively adjacent to the left and right wheels, adapted to be mounted movably on the stroller frame, and interconnected to each other through the connecting member so as to be movable in opposite directions relative to the stroller frame when operated. The left and right braking mechanisms are adapted to engage respectively and simultaneously the left and right wheels when one of the left and right operating members is operated. The left and right braking mechanisms are adapted to disengage respectively and simultaneously the left and right wheels when the other of the left and right operating members is operated. Each of the left and right braking mechanisms includes a first engaging member adapted to be provided on the respective one of the left and right wheels, and a second engaging member adapted to be mounted movably on the stroller frame and movable in an axial direction relative to the axle between an engaging position, in which the second engaging member engages the first engaging member, and a disengaging position, in which the second engaging member is disengaged from the first engaging member.

BRIEF DESCRIPTION OF THE DRAWINGS

Other features and advantages of the present invention will become apparent in the following detailed description of the preferred embodiments of the invention, with reference to the accompanying drawings, in which:

FIGS. 8 and 9 are fragmentary sectional views of the second preferred embodiment to illustrate how a positioning unit is operated to position the left braking mechanism of the brake assembly at the braking state or the releasing state;

FIG. 14 is a fragmentary exploded perspective view of the right braking mechanism of the brake assembly of the fourth preferred embodiment;

FIG. 15 is a fragmentary sectional view to illustrate how a positioning unit is operated to position the brake assembly of the fourth preferred embodiment at the braking state;

FIGS. 17 and 18 are fragmentary sectional views to illustrate how a positioning unit is operated to position the brake assembly of the fifth preferred embodiment at the braking state or the releasing state.

DETAILED DESCRIPTION OF THE PREFERRED EMBODIMENTS

Figure 1:
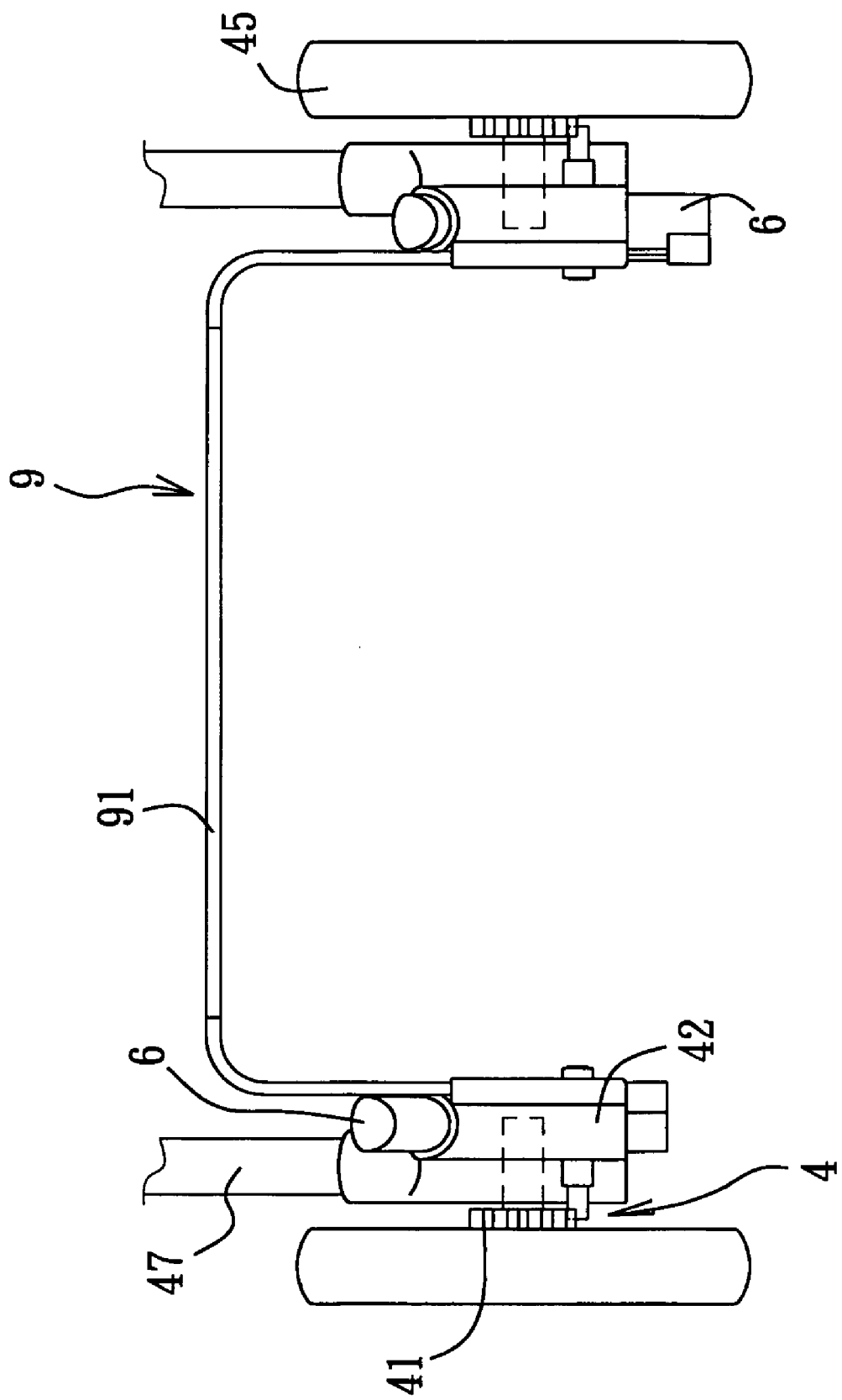
FIG. 1 is a fragmentary schematic view to illustrate a braking state of the first preferred embodiment of a brake assembly for a stroller according to this invention.
Figure 2:
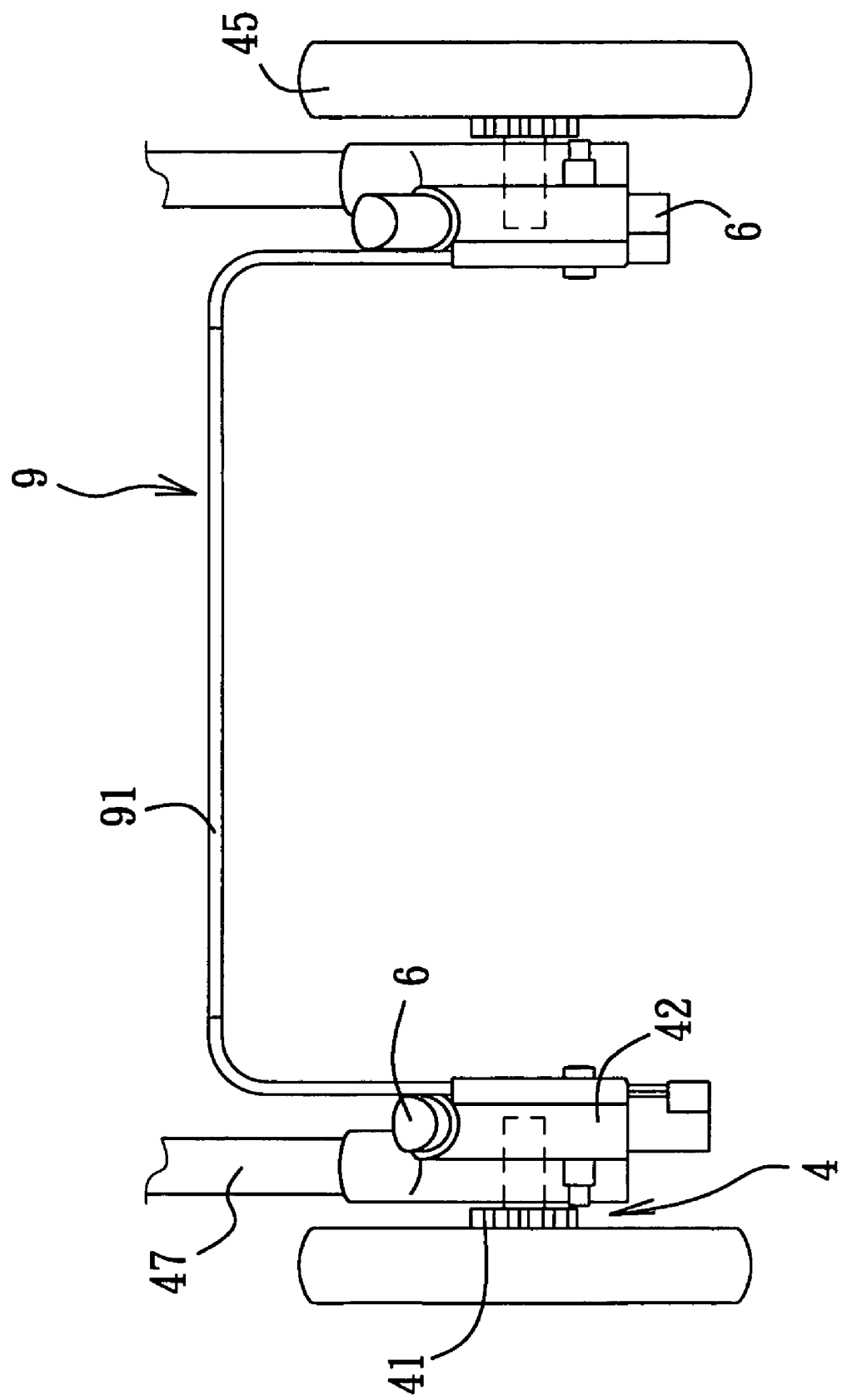
FIG. 2 is a fragmentary schematic view to illustrate a releasing state of the first preferred embodiment.
Figure 3:
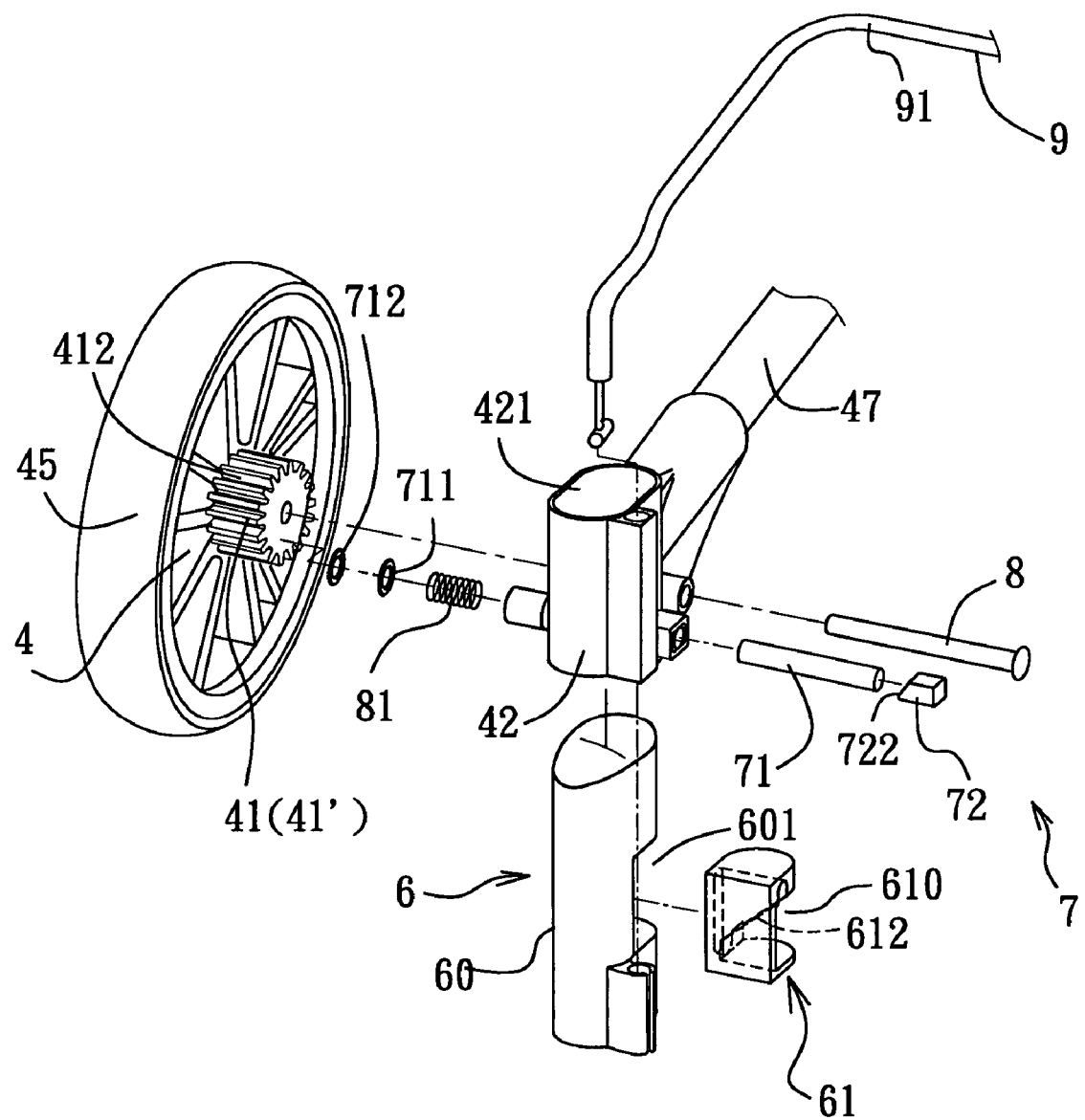
FIG. 3 is a fragmentary exploded perspective view of a left brake mechanism and a left operating member of the brake assembly of the first preferred embodiment.
Figure 4:
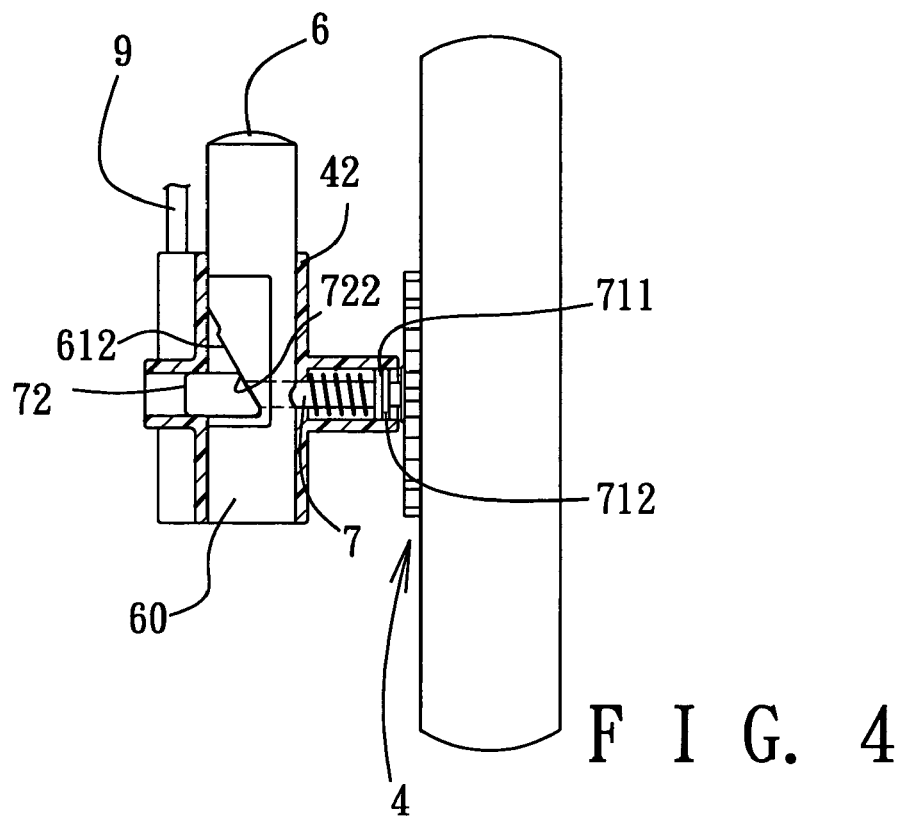
FIGS. 4 and 5 are fragmentary sectional views of the first preferred embodiment to illustrate how an engaging pin of the left braking mechanism is moved into a retaining groove in a retaining gear which is mounted on a left wheel of the stroller when the left operating member is operated.
Figure 5:
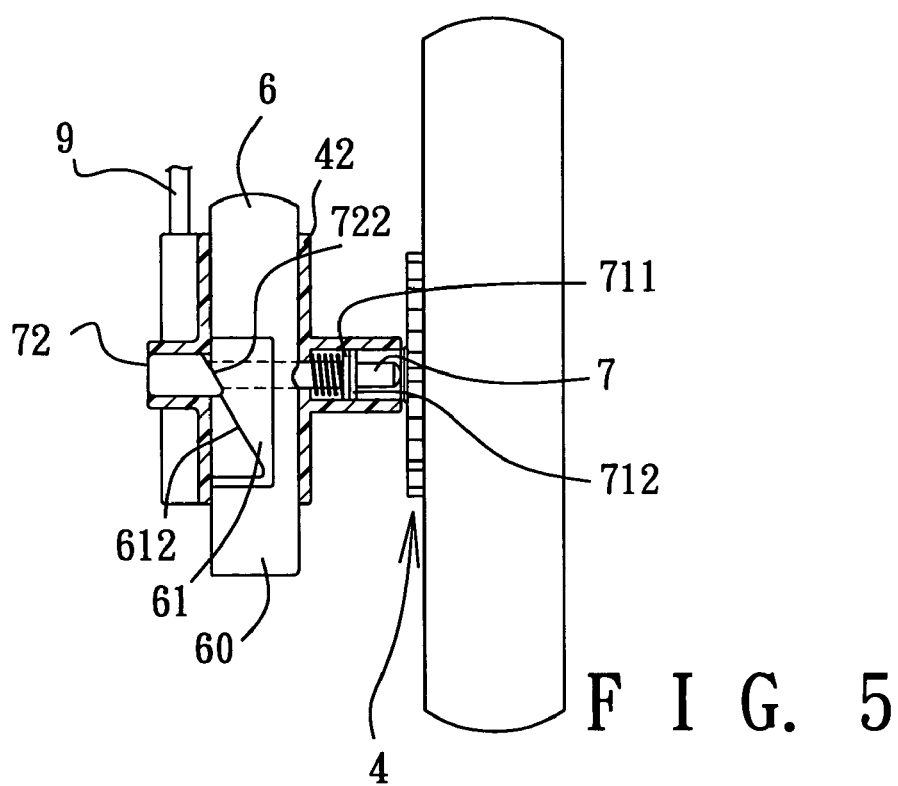
Figure 6:
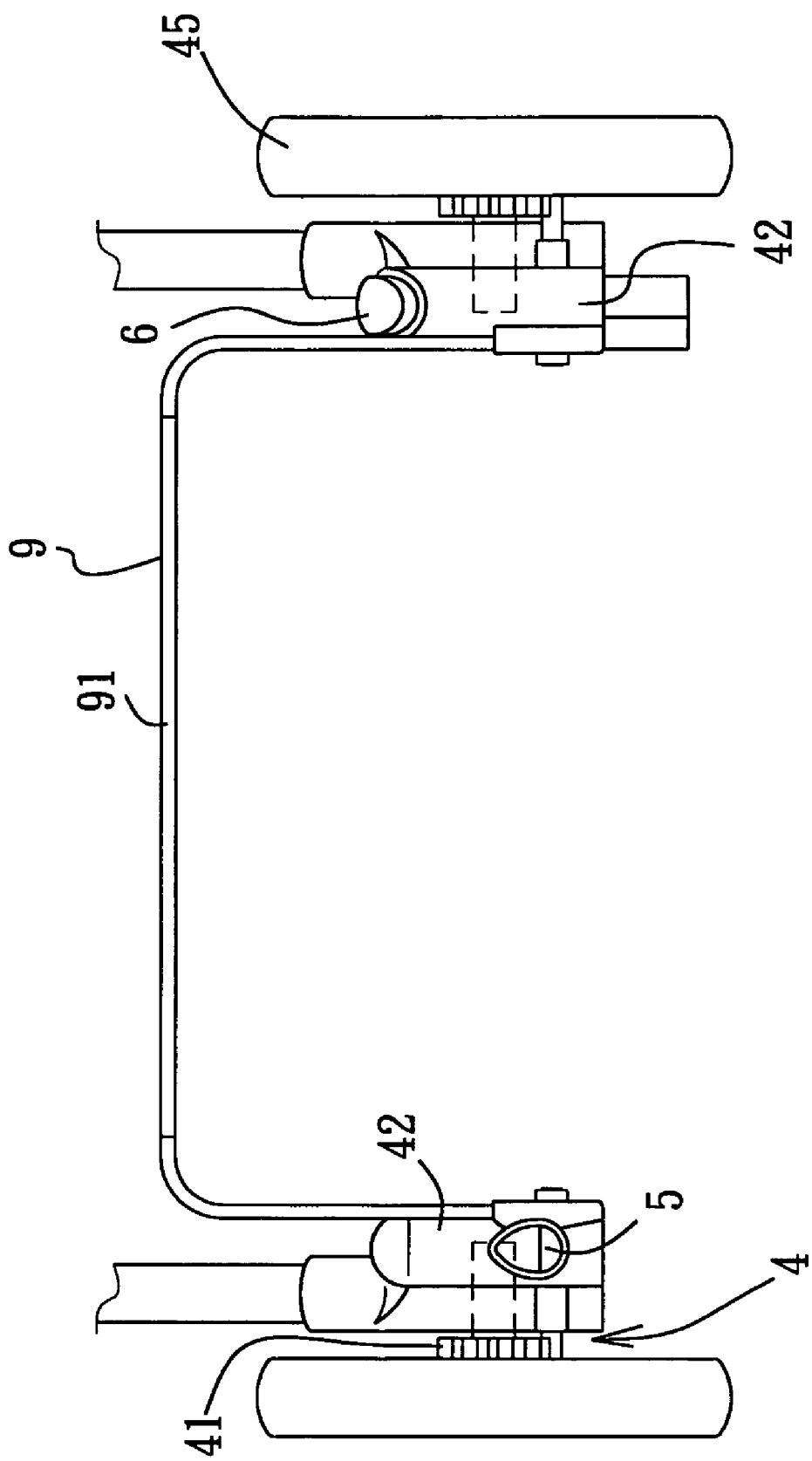
FIG. 6 is a fragmentary schematic view of the second preferred embodiment of a brake assembly for a stroller according to this invention.
Figure 7:
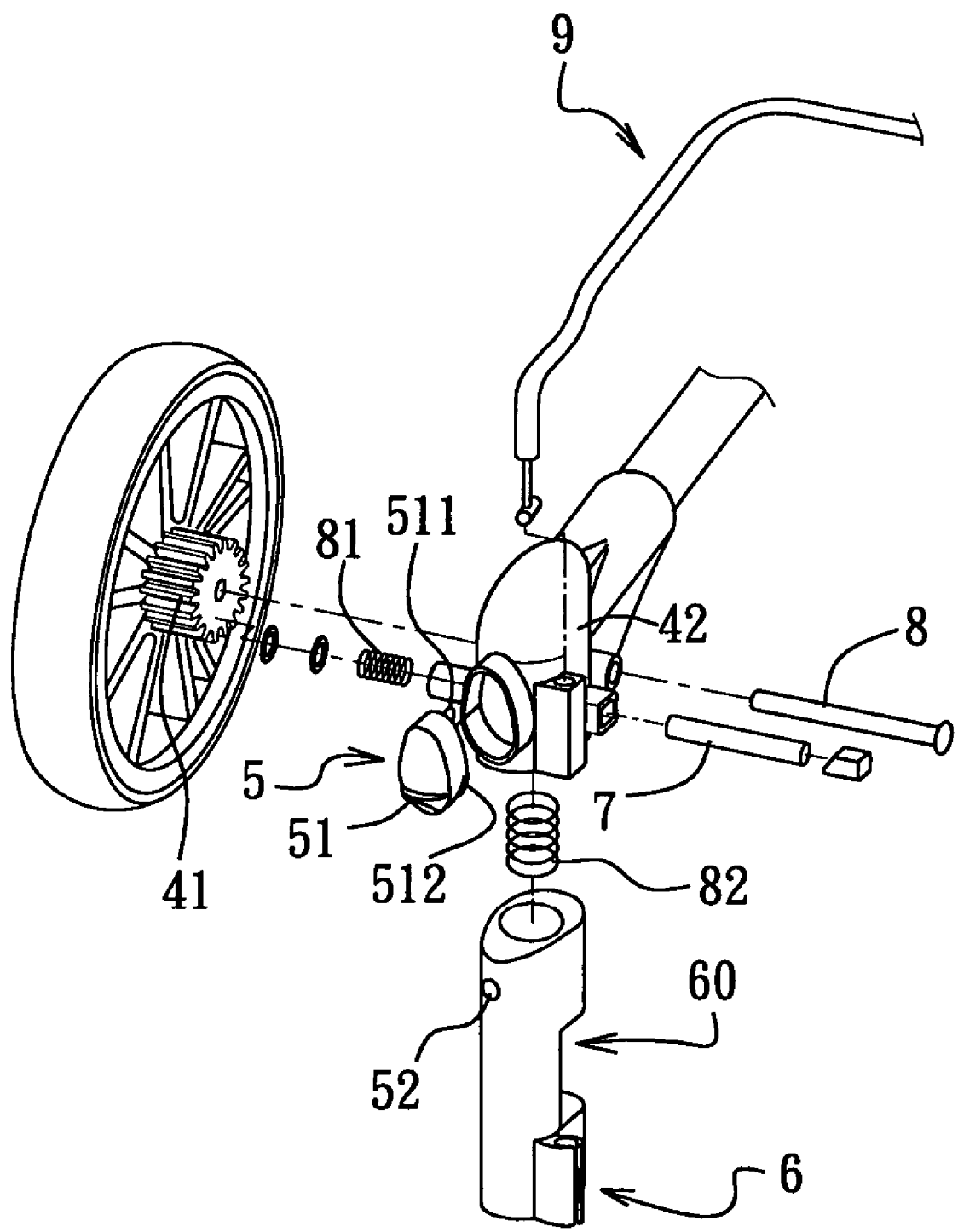
FIG. 7 is a fragmentary exploded perspective view of the left brake mechanism and the left operating member of the brake assembly of the second preferred embodiment.

FIGS. 1 to 5 illustrate the first preferred embodiment of a brake assembly for a stroller according to the present invention. The stroller includes a stroller frame 47 and left and right wheels 45, each of which is connected to the stroller frame 47 through an axle 8.

The brake assembly includes: left and right braking mechanisms 4 associated respectively with the left and right wheels 45 for braking the left and right wheels 45; a connecting member 9; and left and right operating members 6 to be disposed respectively adjacent to the left and right wheels 45, adapted to be mounted movably on the stroller frame 47, and interconnected to each other through the connecting member 9 so as to be movable in opposite directions relative to the stroller frame 47 when operated. The left and right braking mechanisms 4 are adapted to engage respectively and simultaneously the left and right wheels 45 when one of the left and right operating members 6 is operated. The left and right braking mechanisms 4 are adapted to disengage respectively and simultaneously the left and right wheels 45 when the other of the left and right operating members 6 is operated.

Each of the left and right braking mechanisms 4 includes a first engaging member 41 adapted to be provided on the respective one of the left and right wheels 45, and a second engaging member 7 adapted to be mounted movably on the stroller frame 47 and movable in an axial direction relative to the axle 8 between an engaging position (see FIGS. 1 and 4), in which the second engaging member 7 engages the first engaging member 41, and a disengaging position (see FIGS. 2 and 5), in which the second engaging member 7 is disengaged from the first engaging member 41. The second engaging member 7 defines a first cam face 722 that is obliquely angled with respect to the axial direction. Each of the left and right operating members 6 defines a second cam face 612 which is obliquely angled with respect to the axial direction and which is in sliding contact with the first cam face 722 of the second engaging member 7 of the respective one of the left and right braking mechanisms 4 so as to drive the second engaging member 7 to move to the engaging position when said one of the left and right operating members 6 is operated, i.e., the left operating member 6 is pressed downwardly by foot, and so as to drive the second engaging member 7 to move to the disengaging position when the other of the left and right operating members 6 is operated, i.e., the right operating member 6 is pressed downwardly by foot.

In this embodiment, movement of the left and right operating members 6 are guided by left and right guiding members 42 which are adapted to be secured to the stroller frame 47. Each of the left and right guiding members 42 defines a sliding space 421 therein. Each of the left and right operating members 6 includes an elongated sliding piece 60 that is slidably inserted into the sliding space 421 in a respective one of the left and right guiding members 42 and that is formed with a cam-receiving recess 601, and a cam piece 61 that defines the second cam face 612 and that is mounted securely in the cam-receiving recess 601 so as to be co-slidable with the sliding piece 60. The cam piece 61 is formed with a cam follower-receiving recess 610. The second cam face 612 of the cam piece 61 confines an upper side of the cam follower-receiving recess 610.

The second engaging member 7 includes an engaging pin 71 that extends through the cam follower-receiving recess 610 and the sliding space 421 in a respective one of the left and right guiding members 42 for engaging the first engaging member 41 when the sliding pieces 60 of the left and right operating members 6 are moved to a locking position (see FIG. 1). The engaging pin 71 is disengaged from the first engaging member 41 when the sliding pieces 60 of the left and right operating members 6 are moved to an unlocking position (see FIG. 2). The second engaging member 7 further includes a cam follower 72 that is connected to the engaging pin 71 and that defines the first cam face 722. Alternatively, the cam follower 72 and the engaging pin 71 can be formed into one single piece. The cam follower 72 extends into the cam-follower receiving recess 610 in the cam piece 61. The first cam face 722 of the cam follower 72 is received in the cam follower-receiving recess 610, and faces the second cam face 612 of the cam piece 61. It is noted that the cam pieces 61 of the left and right operating members 6 are disposed in a relation that they are inverse to each other and that the cam followers 72 of the second engaging members 7 of the left and right braking mechanisms 4 are disposed in a relation that they are inverse to each other so as to permit simultaneous braking actions of the left and right braking mechanisms 4 upon the left and right wheels 45 when one of the left and right operating members 6 is operated.

The connecting member 9 includes a cable 91 that interconnects the sliding pieces 60 of the left and right operating members 6 so as to permit simultaneously opposite movements of the sliding pieces 60.

The first engaging member 41 of each of the braking mechanisms 4 includes a retaining gear 41' that is secured to the respective one of the left and right wheels 45. The retaining gear 41' defines a plurality of angularly disposed retaining grooves 412 disposed to extend radially relative to the axle 8. The engaging pin 71 engages a selected one of the retaining grooves 412 in the engaging gear 41' when the sliding pieces 60 are moved to the locking position.

Each of the left and right braking mechanisms 4 further includes a first urging member 81 that is sleeved on the engaging pin 71 for urging the engaging pin 71 toward the selected one of the retaining grooves 412. A pair of ring-shaped spring-abutting members 711, 712 are secured to the engaging pin 71, and are disposed adjacent to each other. The first urging member 81 abuts against the spring-abutting member 711.

During brake releasing operation, the left operating member 6 is pressed downwardldy to the unlocking position (i.e., the position of the left operating member 6 is moved from FIGS. 1 and 4 to FIGS. 2 and 5) to move the engaging pin 72 to disengage the selected one of the retaining grooves 412 in the engaging gear 41' through the cam action between the first and second cam faces 722, 612 and to move the right operating member 6 upwardly to the unlocking position through the cable 91. At this time, the first urging member 81 accumulates a restoring force to urge the engaging pin 72 to move toward the engaging gear 41' (see FIG. 5). The braking operation of the brake assembly is a reversed process of the aforesaid brake releasing operation, and is conducted by pressing the right operating member 6 downwardly. The engaging pin 72 is moved to engage the engaging gear 41' by the urging action of the first urging member 81 when the left and right operating members 6 are moved to the locking position.

FIGS. 6 to 9 illustrate the second preferred embodiment of the brake assembly for a stroller according to this invention. The second embodiment differs from the previous embodiment in that the brake assembly further includes a positioning unit 5 for positioning the brake assembly in a braking state or a releasing state.

Figure 10:
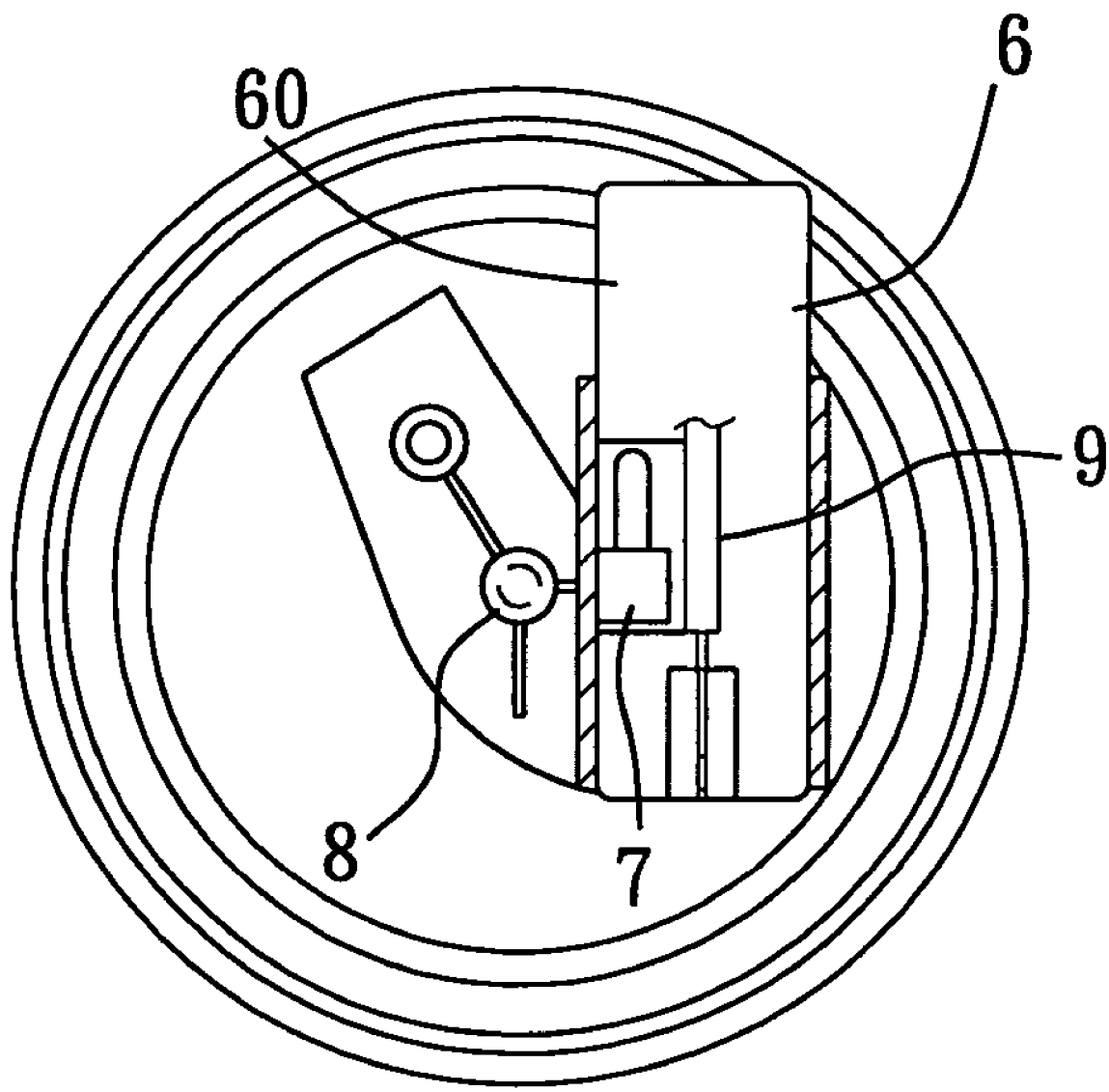
FIG. 10 is a fragmentary sectional view to illustrate the braking state of a right braking mechanism of the brake assembly of the second preferred embodiment.

In this embodiment, the positioning unit 5 includes a pivot seat 51 that is pivoted to the left guiding member 42 and that is formed with a tongue 511. The sliding piece 60 of the left operating member 6 is formed with a groove 52 that engages releasably the tongue 511 of the pivot seat 51 (see FIG. 8) when the sliding piece 60 is moved to the locking position, and that is disengaged from the tongue 511 (see FIG. 9) when the sliding piece 60 is moved to the unlocking position. FIG. 10 illustrates the unlocking position of the sliding piece 60 of the right operating member 6, which is in an upper level with respect to the sliding piece 60 of the left operating member 6 shown in FIG. 9.

In addition, the pivot seat 51 is further formed with an elastic arm 512 that abuts elastically and slidingly against the sliding piece 60 so as to provide a resistance against pivoting movement of the pivot seat 51 when the pivot seat 51 is pressed by foot for disengaging the tongue 511 of the pivot seat 51 from the groove 52 in the sliding piece 60 of the left operating member 6. The positioning unit 5 further includes a second urging member 82 for urging the sliding piece 60 to move toward the unlocking position.

During braking operation, the sliding piece 60 of the right operating member 6 is pressed downwardly to move to the locking position, which results in pulling of the sliding piece 60 of the left operating member 6 to move upwardly to the locking position through the cable 91, and engagement between the tongue 511 of the pivot seat 51 and the groove 52 in the sliding piece 60 of the left operating member 6, thereby retaining the left and right operating members at the locking position. During brake releasing operation, the elastic arm 512 is pressed inwardly by foot, which results in disengagement between the tongue 511 of the pivot seat 51 and the groove 52 in the sliding piece 60 of the left operating member 6, thereby permitting downward movement of the sliding piece 60 of the left operating member 6 the unlocking position by the urging action of the second urging member 82.

Figure 11:
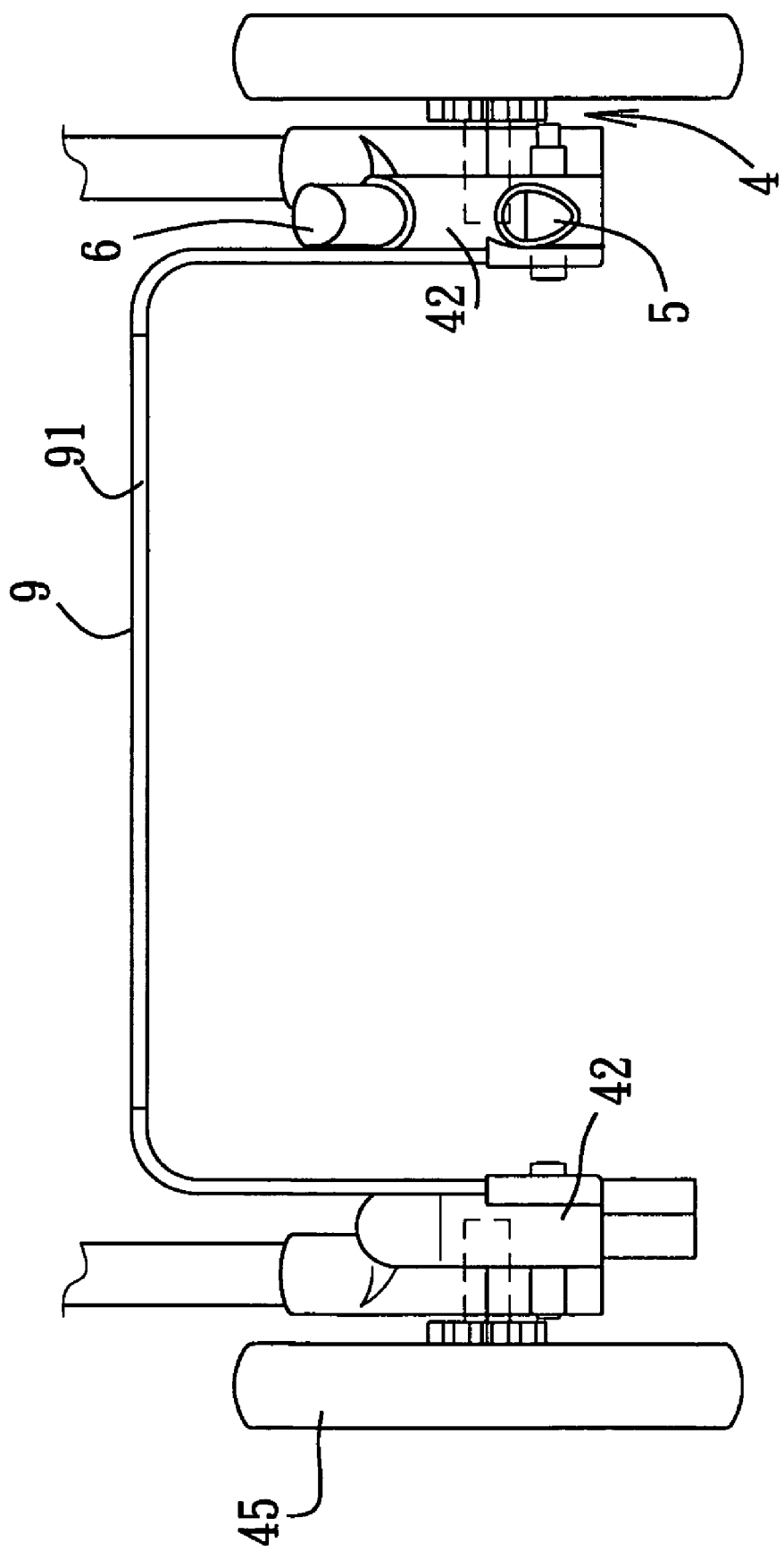
FIG. 11 is a fragmentary schematic view of the third preferred embodiment of the brake assembly for a stroller according to this invention.
Figure 12:
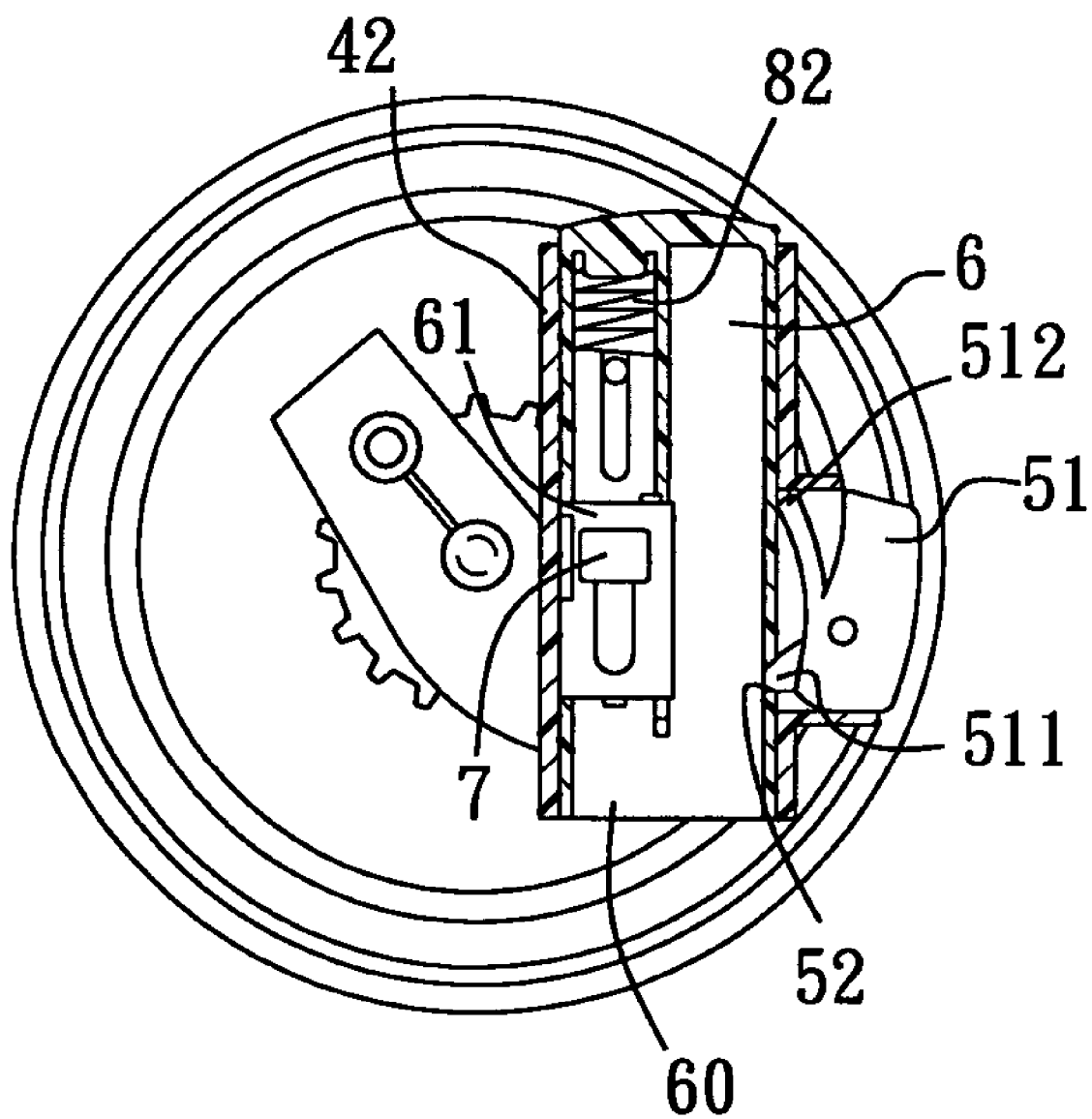
FIG. 12 is a fragmentary sectional view of the right braking mechanism of the brake assembly of the third preferred embodiment.

FIGS. 11 and 12 illustrate the third preferred embodiment of the brake assembly for a stroller according to this invention. The third preferred embodiment differs from the second preferred embodiment in that the positioning unit 5 is installed on the right guiding member 42. Since the movements of the sliding pieces 60 of the left and right operating members 6 of this embodiment are respectively opposite to the sliding pieces 60 of the second preferred embodiment, the pivot seat 51 of this embodiment is mounted on the right guiding member 42 in a reversed manner as compared to the pivot seat 51 of the second preferred embodiment so that when the sliding piece 60 of the right operating member 6 is disposed at the locking position (see FIG. 12), the tongue 511 of the pivot seat 51 can engage the groove 52 in the sliding piece 60, thereby positioning the right operating member 6 at the locking position. As such, the configuration of this embodiment permits both braking and brake releasing operations to be operated at the same side, i.e., a right side of the stroller.

Figure 13:
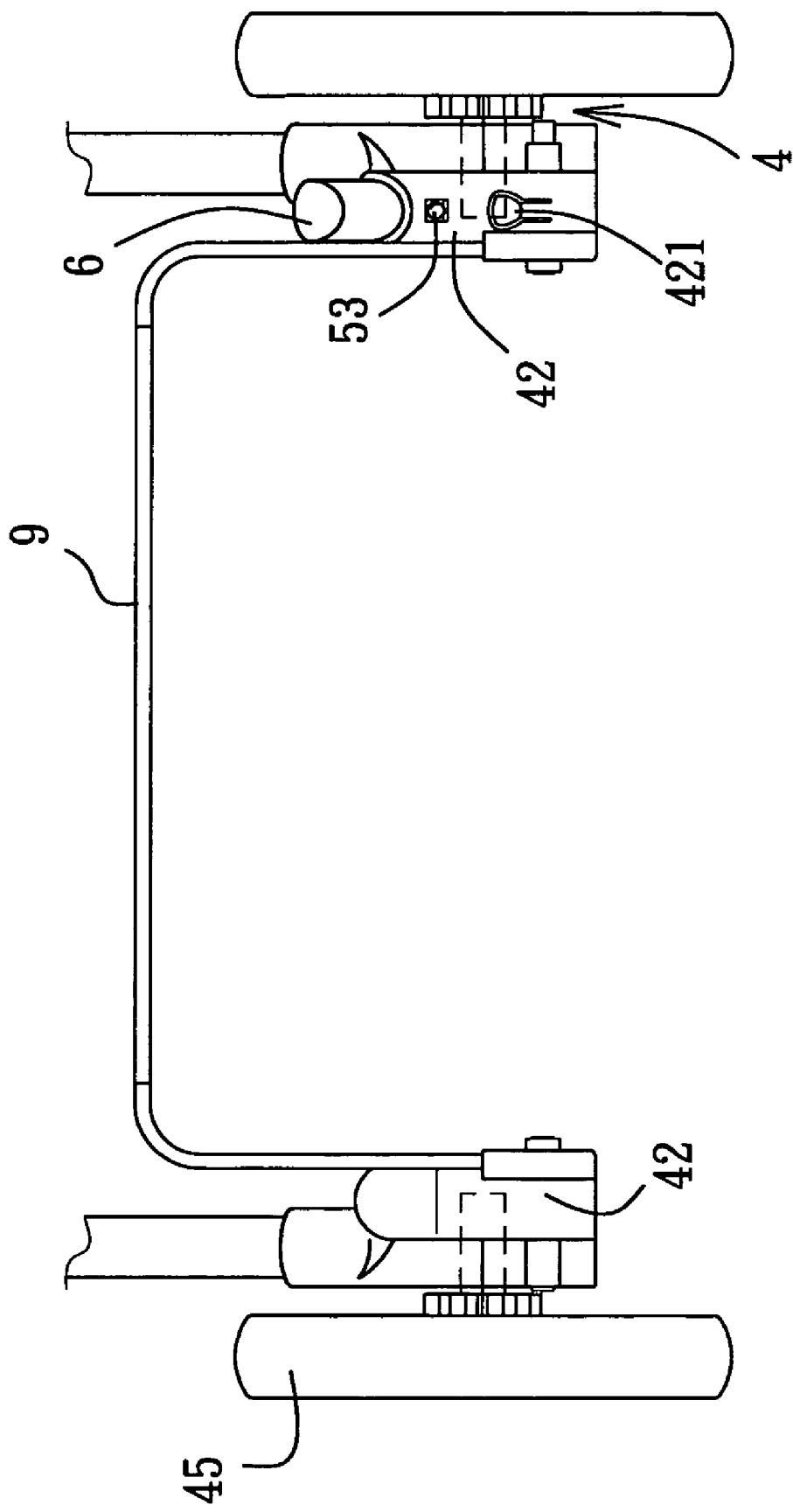
FIG. 13 is a fragmentary schematic view of the fourth preferred embodiment of the brake assembly for a stroller according to this invention.

FIGS. 13 to 15 illustrate the fourth preferred embodiment of the brake assembly for a stroller according to this invention. The fourth preferred embodiment differs from the first preferred embodiment in that the brake assembly further includes a positioning unit 5 for positioning the brake assembly in a braking state or a releasing state.

The positioning unit 5 has a first elastic tab 54 that is formed on the sliding piece 60 of the right operating member 6 and that is formed with a tongue 541, and a slit 420 that is formed in the right guiding member 42 in such a manner so as to form a second elastic tab 421 on the right guiding member 42. The tongue 541 of the first elastic tab 54 extends into the slit 420 in the right guiding member 42, and abuts against a periphery 422 of the slit 420 (see FIG. 15) when the sliding piece 60 is moved to the locking position, thereby positioning the left and right operating members 6 at the locking position. The second elastic tab 421 is registered with the first elastic tab 54, and is pressable to move the first elastic tab 54 so as to disengage the tongue 541 from the periphery of the slit 420.

The positioning unit 5 further has a groove 53 that is formed in the right guiding member 42. The tongue 541 of the first elastic tab 54 extends into the groove 53 (not shown) when the sliding piece 60 is moved to the unlocking position.

During brake releasing operation, the second elastic tab 421 is pressed inwardly, which results in disengagement between the tongue 541 and the periphery of the slit 420 and upward movement of the sliding piece 60 of the right operating member 6 to the unlocking position by the urging action of the second urging member 82.

Figure 16:
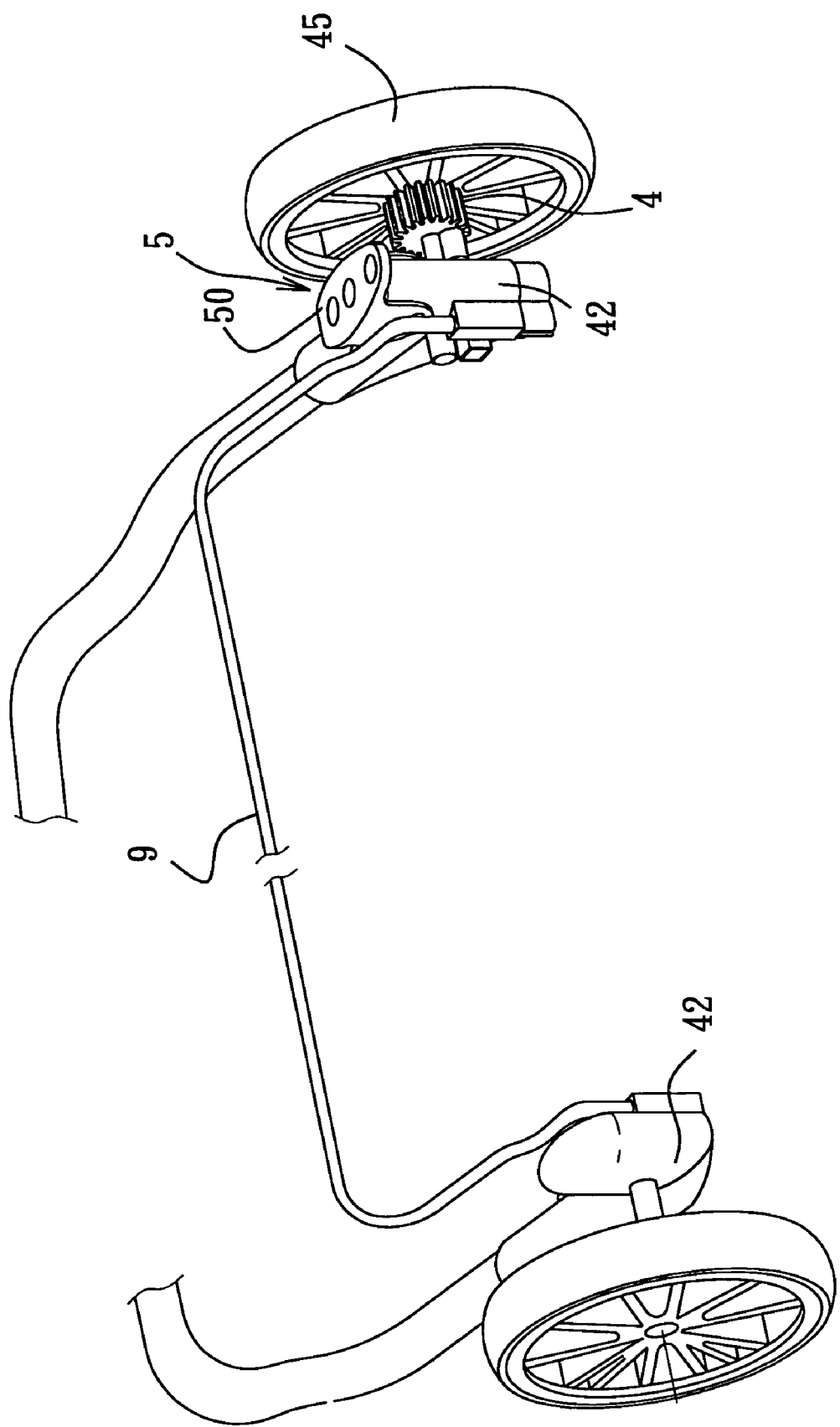
FIG. 16 is a fragmentary perspective view of the fifth preferred embodiment of the brake assembly for a stroller according to this invention.

FIGS. 16 to 18 illustrate the fifth preferred embodiment of the brake assembly for a stroller according to this invention. The fifth preferred embodiment differs from the first preferred embodiment in that the brake assembly further includes a positioning unit 5 for positioning the brake assembly in a braking state or a releasing state.

The positioning unit 5 includes a pedal 50 that is pivoted to the right guiding member 42 through a pivot pin 43, that is pivotable relative to the right guiding member 42 between first and second angular positions (see FIGS. 17 and 18), and that is connected to the sliding piece 60 of the right operating member 6 for driving sliding movement of the sliding piece 60. The sliding piece 60 is driven by the pedal 50 through a connecting pin 44 to move from the unlocking position to the locking position when the pedal 50 is moved from the first angular position (see FIG. 17) to the second angular position (see FIG. 18), and to move from the locking position to the unlocking position when the pedal 50 is moved from the second angular position to the first angular position.

In this embodiment, the right guiding member 42 is formed with an arcuate slot 55. The connecting pin 44 extends through the arcuate slot 55 and the sliding piece 60 so as to permit sliding movement of the sliding piece 60 when the pedal 50 is pivoted about the pivot pin 43. Pivoting movement of the pedal 50 is limited within two opposite ends of the arcuate slot 55.

The positioning unit 5 further includes a tongue 571 that is formed on the pedal 50, and first and second grooves 572 that are formed in the right guiding member 42 and that are spaced apart from each other. The tongue 571 engages releasably the first groove 572 in the right guiding member 42 when the pedal 50 is disposed at the first angular position (see FIG. 17), and engages releasably the second groove 572 in the right guiding member 42 when the pedal 50 is disposed at the second angular position (see FIG. 18).

In the embodiments described hereinabove, the cam piece 61 is replaceable so as to reduce maintainance and repair costs.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A brake assembly for a stroller, the stroller including a stroller frame and left and right wheels, each of which is connected to the stroller frame through an axle, said brake assembly comprising:

left and right braking mechanisms associated respectively with the left and right wheels for braking the left and right wheels;

a connecting member; and left and right operating members to be disposed respectively adjacent to the left and right wheels, adapted to be mounted movably on the stroller frame, and interconnected to each other through said connecting member so as to be movable in opposite directions relative to the stroller frame when operated, said left and right braking mechanisms being adapted to engage respectively and simultaneously the left and right wheels when one of said left and right operating members is operated, said left and right braking mechanisms being adapted to disengage respectively and simultaneously the left and right wheels when the other of said left and right operating members is operated;

wherein each of said left and right braking mechanisms includes a first engaging member adapted to be provided on the respective one of the left and right wheels, and a second engaging member adapted to be mounted movably on the stroller frame and movable in an axial direction relative to the axle between an engaging position, in which said second engaging member engages said first engaging member, and a disengaging position, in which said second engaging member is disengaged from said first engaging member; and wherein said second engaging member defines a first cam face that is obliquely angled with respect to said axial direction, each of said left and right operating members defining a second cam face which is obliquely angled with respect to said axial direction and which is in sliding contact with said first cam face of said second engaging member of the respective one of said left and right braking mechanisms so as to drive said second engaging member to move to said engaging position when said one of said left and right operating members is operated;

said brake assembly further comprising left and right guiding members adapted to be secured to the stroller frame, each of said left and right guiding members defining a sliding space therein, each of said left and right operating members including an elongated sliding piece that is slidably inserted into said sliding space in a respective one of said left and right guiding members and that is formed with a cam-receiving recess, and a cam piece that defines said second cam face and that is mounted securely in said cam-receiving recess so as to be co-slidable with said sliding piece, said second engaging member including an engaging pin that extends through said cam piece and said sliding space in a respective one of said left and right guiding members for engaging said first engaging member when said sliding piece is moved to a locking position, said engaging pin being disengaged from said first engaging member when said sliding piece is moved to an unlocking position, said second engaging member further including a cam follower that is connected securely to said engaging pin and that defines said first cam face.

2. The brake assembly of claim 1, wherein said cam piece is formed with a cam follower-receiving recess, said second cam face confining an upper side of said cam follower-receiving recess, said cam follower extending into said cam-follower receiving recess, said first cam face of said cam follower being received in said cam follower-receiving recess and facing said second cam face of said cam piece.

3. The brake assembly of claim 2, wherein said first engaging member of each of said left and right braking mechanisms includes a retaining gear that is adapted to be secured to the respective one of the left and right wheels and that defines a plurality of angularly disposed retaining grooves disposed to extend radially relative to the axle, said engaging pin engaging a selected one of said retaining grooves when said left operating member is operated, said engaging pin disengaging the selected one of said retaining grooves when said right operating member is operated.

4. The brake assembly of claim 3, wherein each of said left and right braking mechanisms further includes an urging member that is sleeved on said engaging pin for urging said engaging pin toward the selected one of said retaining grooves.

5. The brake assembly of claim 1, further comprising a positioning unit including a pivot seat that is pivoted to one of said left and right guiding members and that is formed with a tongue, said sliding piece being formed with a groove that engages releasably said tongue when said sliding piece is moved to said locking position and that is disengaged from said tongue when said sliding piece is moved to said unlocking position.

6. The brake assembly of claim 5, wherein said positioning unit further includes an urging member for urging said sliding piece to move toward said unlocking position.

7. The brake assembly of claim 5, wherein said pivot seat is further formed with an elastic arm that abuts elastically and slidingly against said sliding piece so as to provide a resistance against pivoting movement of said pivot seat when said pivot seat is pressed.

8. The brake assembly of claim 1, further comprising a positioning unit having a first elastic tab that is formed on said sliding piece and that is formed with a tongue, and a slit that is formed in one of said left and right guiding members in such a manner so as to form a second elastic tab on said one of said left and right guiding members, said tongue extending into said slit and abutting against a periphery of said slit when said sliding piece is moved to said locking position, said second elastic tab being registered with said first elastic tab and being pressable to move said first elastic tab so as to disengage said tongue from said periphery of said slit.

9. The brake assembly of claim 8, wherein said positioning unit further includes a groove that is formed in said one of said left and right guiding members, said tongue extending into said groove when said sliding piece is moved to said unlocking position.

10. The brake assembly of claim 8, wherein said positioning unit further includes an urging member for urging said sliding piece to move toward said unlocking position.

11. The brake assembly of claim 1, further comprising a positioning unit including a pedal that is pivoted to one of said left and right guiding members, that is pivotable relative to said one of said left and right guiding members between first and second angular positions, and that is connected to said sliding piece for driving sliding movement of said sliding piece, said sliding piece being driven by said pedal to move from said locking position to said unlocking position when said pedal is moved from said first angular position to said second angular position and to move from said unlocking position to said locking position when said pedal is moved from said second angular position to said first angular position.

12. The brake assembly of claim 11, wherein said one of said left and right guiding members is formed with an arcuate slot, said positioning unit further including a connecting pin that extends through said arcuate slot and said sliding piece, said sliding piece being driven by said pedal through said connecting pin.

13. The brake assembly of claim 11, wherein said positioning unit further includes a tongue that is formed on said pedal, and first and second grooves that are formed in said one of said left and right guiding members and that are spaced apart from each other, said tongue engaging releasably said first groove in said one of said left and right guiding members when said pedal is disposed at said first angular position, and engaging releasably said second groove in said one of said left and right guiding members when said pedal is disposed at said second angular position.

14. A brake assembly for a stroller, the stroller including a stroller frame and left and right wheels, each of which is connected to the stroller frame through an axle, said brake assembly comprising:

left and right braking mechanisms associated respectively with the left and right wheels for braking the left and right wheels;

a connecting member; and left and right operating members to be disposed respectively adjacent to the left and right wheels, adapted to be mounted movably on the stroller frame, and interconnected to each other through said connecting member so as to be movable in opposite directions relative to the stroller frame when operated, said left and right braking mechanisms being adapted to engage respectively and simultaneously the left and right wheels when one of said left and right operating members is operated;

wherein each of said left and right braking mechanisms includes a first engaging member adapted to be provided on the respective one of the left and right wheels, and a second engaging member adapted to be mounted movably on the stroller frame and movable in an axial direction relative to the axle between an engaging position, in which said second engaging member engages said first engaging member, and a disengaging position, in which said second engaging member is disengaged from said first engaging member; and wherein said second engaging member defines a first cam face that is obliquely angled with respect to said axial direction, each of said left and right operating members defining a second cam face which is obliquely angled with respect to said axial direction and which is in sliding contact with said first cam face of said second engaging member of the respective one of said left and right braking mechanisms so as to drive said second engaging member to move to said engaging position when said one of said left and right operating members is operated;

said brake assembly further comprising left and right guiding members adapted to be secured to the stroller frame, each of said left and right guiding members defining a sliding space therein, each of said left and right operating members including an elongated sliding piece that is slidably inserted into said sliding space in a respective one of said left and right guiding members and that is formed with a cam-receiving recess, and a cam piece that defines said second cam face and that is mounted securely in said cam-receiving recess so as to be co-slidable with said sliding piece, said second engaging member including an engaging pin that extends through said cam piece and said sliding space in a respective one of said left and right guiding members for engaging said first engaging member when said sliding piece is moved to a locking position, said engaging pin being disengaged from said first engaging member when said sliding piece is moved to an unlocking position, said second engaging member further including a cam follower that is connected securely to said engaging pin and that defines said first cam face.

* * * * *